US012669768B2

(12) United States Patent
Tanaka et al.

(10) Patent No.: US 12,669,768 B2
(45) Date of Patent: Jun. 30, 2026

(54) IMAGE FORMING DEVICE INCLUDING SWITCH SWITCHING ACCORDING TO WHETHER FIXING DEVICE IS MOUNTED OR REMOVED

(71) Applicant: BROTHER KOGYO KABUSHIKI KAISHA, Nagoya (JP)

(72) Inventors: Nobuyuki Tanaka, Konan (JP); Shuji Kawasaki, Nagoya (JP); Yoshiyuki Tsujimoto, Nagoya (JP); Ryota Asaoka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 18/758,403

(22) Filed: Jun. 28, 2024

(65) Prior Publication Data

US 2025/0004409 A1 Jan. 2, 2025

(30) Foreign Application Priority Data

Jun. 30, 2023 (JP) ................................ 2023-108292

(51) Int. Cl.

*G03G 21/00* (2006.01)
*G03G 15/00* (2006.01)
*G03G 21/16* (2006.01)

(52) U.S. Cl.

CPC ......... *G03G 15/5004* (2013.01); *G03G 15/80* (2013.01); *G03G 21/1633* (2013.01); *G03G 21/1685* (2013.01); *G03G 2221/1639* (2013.01)

(58) Field of Classification Search

CPC ............... G03G 15/5004; G03G 15/80; G03G 21/1633; G03G 21/1685; G03G 2221/1639

(Continued)

(56) References Cited

U.S. PATENT DOCUMENTS

2006/0140675 A1* 6/2006 Kim .................. G03G 21/1685 399/122
2007/0242960 A1* 10/2007 Kobayashi ......... G03G 15/2064 399/13

(Continued)

FOREIGN PATENT DOCUMENTS

JP H11202722 A 7/1999
JP 2011209486 A 10/2011
JP 2017203944 A 11/2017

*Primary Examiner* — Robert B Beatty

(74) *Attorney, Agent, or Firm* — Scully, Scott, Murphy & Presser, P.C.

(57) ABSTRACT

In an image forming device, a device body has an opening. A process member forms a developer image on a sheet. The fixing device fixes the developer image on the sheet. A fixing device is removable from the device body through the opening. A process-power supply member supplies process-power to the process member based on power inputted from a power supply member. A switch switchable between: a first state in which the switch allows connection between the process-power supply member and the power supply member; and a second state in which the switch disconnects the process-power supply member from the power supply member to interrupt input of the process-power to the process-power supply member. The switch switches to the first state when the fixing device is mounted in the device body. The switch switches to the second state when the fixing device is removed from the device body.

18 Claims, 8 Drawing Sheets

(58) Field of Classification Search
USPC .......................................... 399/13, 33, 88, 90
See application file for complete search history.

(56) References Cited

U.S. PATENT DOCUMENTS

| | | | | |
|---|---|---|---|---|
| 2015/0093124 | A1* | 4/2015 | Miyake | G03G 15/2028 399/18 |
| 2015/0125172 | A1* | 5/2015 | Fujikura | G03G 21/1647 399/67 |
| 2017/0261922 | A1* | 9/2017 | Kato | G03G 15/2064 |
| 2019/0004474 | A1* | 1/2019 | Kamiya | G03G 21/1685 |
| 2019/0107799 | A1* | 4/2019 | Carter | G03G 21/1647 |

* cited by examiner

IMAGE FORMING DEVICE INCLUDING SWITCH SWITCHING ACCORDING TO WHETHER FIXING DEVICE IS MOUNTED OR REMOVED

REFERENCE TO RELATED APPLICATIONS

This application claims priority from Japanese Patent Application No. 2023-108292 filed on Jun. 30, 2023. The entire content of the priority application is incorporated herein by reference.

BACKGROUND ART

A conventional image forming device has a device body with a cover that can be open and closed, and a fixing device that can be mounted in and removed from the device body while the cover is open. The fixing device includes fixing heaters powered by an AC drive power supplied via an AC power supply line. This image forming device also has a first switch that disconnects the AC power supply line when the user opens the cover, and a second switch that disconnects the AC power supply line when the user removes the fixing unit. Thus, this conventional image forming device interrupts the supply of AC drive power from the device body to the heaters in conjunction with a user operation to open the cover.

SUMMARY

However, some image forming devices are configured to discharge sheets directly onto the cover when the cover is open after the sheets have passed through the fixing device. The above configuration cannot be applied to such image forming devices because power supplied from the device body to the heaters is interrupted when the cover is opened whereby developer images transferred onto the sheets cannot be fixed to the sheets.

In view of the foregoing, it is an object of the present disclosure to provide a technology enabling an image forming device to supply power to each component in the device body including the motor that drives the conveying rollers, the process power supply that supplies a process power to process members for forming images on sheets, and the fixing device, even when the cover is open, and enabling the image forming device to interrupt the power supply to each component in the device body when the fixing device is removed from the device body while the cover is open.

In view of the foregoing, it is an object of the present disclosure to provide an image forming apparatus an image forming device. The image forming device includes a device body, a cover, a process member, a fixing device, a conveyance roller, a motor, a power supply member, a motor drive member, and a switch. The device body has an opening. The cover is configured to open and close the opening. The process member is configured to form a developer image on a sheet. The fixing device is removably mountable in the device body. The fixing device mounted in the device body is configured to fix the developer image formed on the sheet. The fixing device is removable from the device body through the opening when the cover is open. The conveyance roller is configured to convey the sheet toward the process member and the fixing device. The motor is configured to rotate the conveyance roller. The power supply member is configured to output power. The motor drive member is configured to rotate the motor using the power inputted from the power supply member. The switch is switchable between: a first state in which the switch connects the motor drive member to the power supply member to allow input of the power to the motor drive member from the power supply member; and a second state in which the switch disconnects the motor drive member from the power supply member to interrupt input of the power to the motor drive member from the power supply member when the fixing device is removed from the device body. The switch is configured to switch to the first state when the fixing device is mounted in the device body. The switch is configured to switch to the second state when the fixing device is removed from the device body.

In the above structures, the image forming device includes the switch that is on (the first state) when the fixing device is mounted in the device body and off (the second state) when the fixing device is removed from the device body 2, regardless of whether the cover is open or closed. Because power can be inputted from the power supplying member into the motor drive circuit when the switch is in the first state, regardless of whether the cover is open or closed, the image forming device can discharge sheets conveyed through the process member and the fixing device onto the cover even when the cover is in the open state. Conversely, when the user has removed the fixing device through the cover in the open state, the switch can interrupt the input of power from the power supplying member into the motor drive circuit.

In order to attain the above and other object, the present disclosure provides an image forming device. The image forming device includes a device body, a cover, a process member, a fixing device, a power supply member, a process-power supply member, and a switch. The device body has an opening. The cover is configured to open and close the opening. The process member is configured to form a developer image on a sheet. The fixing device is removably mountable in the device body. The fixing device mounted in the device body is configured to fix the developer image formed on the sheet. The fixing device is removable from the device body through the opening when the cover is open. The power supply member is configured to output power. The process-power supply member is configured to supply process-power to the process member based on the power inputted from the power supply member. The switch switchable between: a first state in which the switch allows connection between the process-power supply member and the power supply member to allow input of the process-power to the process-power supply member from the power supply member; and a second state in which the switch disconnects the process-power supply member from the power supply member to interrupt input of the process-power to the process-power supply member from the power supply member. The switch is configured to switch to the first state when the fixing device is mounted in the device body. The switch is configured to switch to the second state when the fixing device is removed from the device body.

In the above structure, the image forming device is provided with the switch that turns on when the fixing device is mounted in the device body and that turns off when the fixing device is removed from the device body, regardless of whether the cover is open or closed. Because power from the power supplying member can be inputted into the process-power supplying member when the switch is in the first state, irrespective of whether the cover is open or closed, the image forming device can discharge sheets conveyed through the process member and fixing device onto the cover when the cover is open. Conversely, when the cover is in the open state and the user removes the fixing device, the switch can interrupt the input of power from the power supplying member to the process-power supplying member.

DESCRIPTION

An embodiment of the present disclosure will be described while referring to the accompanying drawings.

Figure 1:
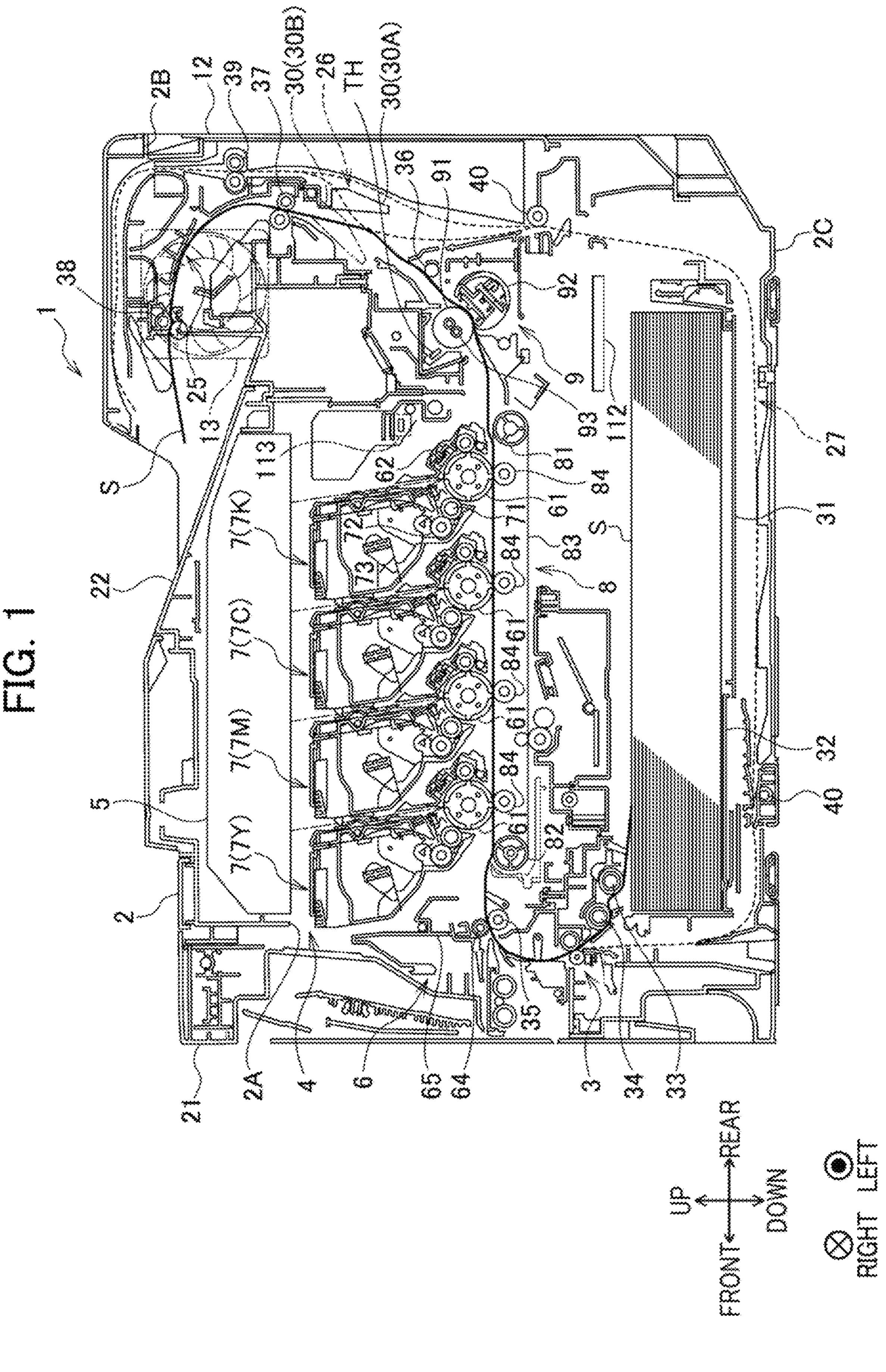
FIG. 1 is a cross-section view illustrating an overall configuration of a color laser printer.

FIG. 1 is a cross-sectional view showing the overall configuration of a color laser printer 1 according to one embodiment of the present disclosure. The color laser printer 1 is an example of the image forming device. Hereinafter, the color laser printer 1 will be abbreviated as the "printer 1." The printer 1 is provided with a device body 2, a conveying member 3, a process member 4, and a fixing device 9. For convenience, the up/down and front/rear directions of the printer 1 in the following description are defined as indicated by the arrows in FIG. 1. Additionally, the side (far side) of the printer 1 in FIG. 1 visible to the viewer will be defined as the left side while the opposite side (near side) not visible in the drawing will be defined as the right side.

The device body 2 has a front cover 21, a rear cover 12, a supply tray 31, a discharge tray 22, and first through third conveying paths 25-27. The front cover 21 opens and closes a front opening 2A formed in the front portion of the device body 2. The front cover 21 is attached to the front side of the device body 2 so as to be capable of opening and closing. The rear cover 12 opens and closes a rear opening 2B formed in the rear portion of the device body 2. The rear cover 12 is attached to the rear side of the device body 2 so as to be capable of opening and closing. The supply tray 31 is removably mounted in the lower portion of the device body 2. The supply tray 31 supports sheets S. The sheets S are of a standard size, such as the A4 size. The sheets S are a paper medium, such as plain paper or card stock, but are not limited to a paper medium. For example, the sheets S may be a transparent plastic, also known as transparencies. The discharge tray 22 is provided on the top of the device body 2 for supporting sheets S after images have been formed thereon.

Figure 6:
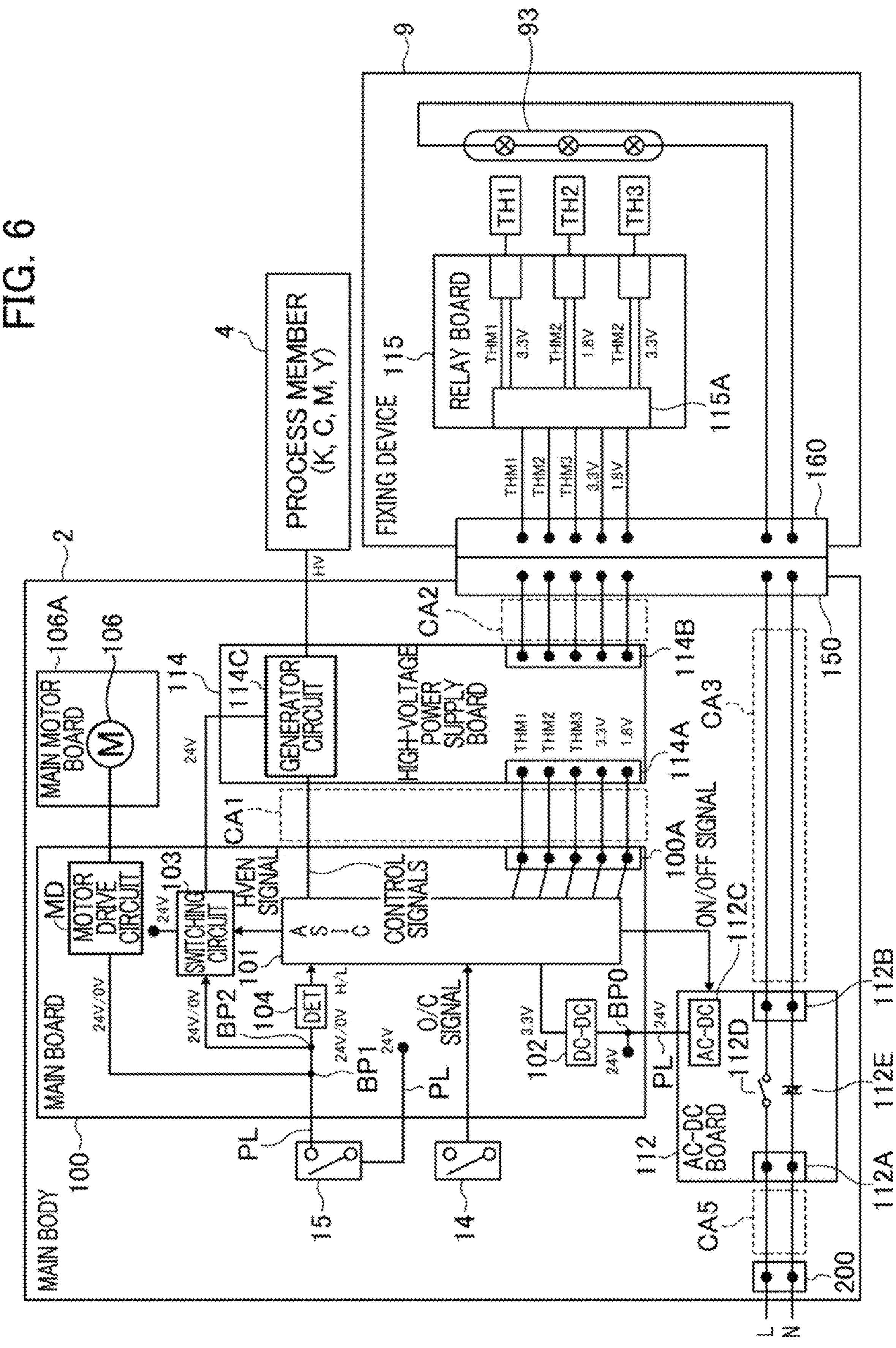
FIG. 6 is a block diagram illustrating signal transmission paths in the color laser printer shown in FIG. 1.

The conveying member 3 has a pickup roller 33, a separating roller 34, a registration roller 35, a first conveying roller 36, a second conveying roller 37, a first switchback roller 38, a second switchback roller 39, a plurality of third conveying rollers 40, a flapper 30, and a main motor 106 (see FIG. 6). A portion of the second conveying path 26 is formed by the rear cover 12 when the rear cover 12 is in a closed state.

A sheet pressing plate 32 is provided in the supply tray 31 for pressing the sheets S upward toward the pickup roller 33. The pickup roller 33 picks up sheets S from the supply tray 31 and conveys the sheets S toward the first conveying path 25. The separating roller 34 separates the sheets S picked up by the pickup roller 33 so that only one sheet S is conveyed at a time.

The registration roller 35 is disposed on the first conveying path 25 upstream from the process member 4. The registration roller 35 first straightens the front edge of the sheet S so that the edge is aligned in the left-right direction and then conveys the sheet S toward the process member 4. The direction in which the registration roller 35 conveys sheets S is the front-to-rear direction.

In a case that the rear cover 12 is closed and the conveying member 3 is conveying a sheet S from the process member 4 toward the outside of the device body 2, the first conveying roller 36 conveys the sheet S exiting the process member 4 while the flapper 30 (in the position indicated by 30A) guides the sheet S along the first conveying path 25. Thereafter, the second conveying roller 37 and first switchback roller 38 of the conveying member 3 convey the sheet S along the first conveying path 25 and discharge the sheet S onto the discharge tray 22.

On the other hand, in a case that the rear cover 12 is open and the conveying member 3 conveys the sheet S from the process member 4 toward the outside of the device body 2, the first conveying roller 36 conveys the sheet S exiting the process member 4 while the flapper 30, which has pivoted into the position depicted by a virtual line (indicated by 30B), guides the sheet S rearward so that the sheet S passes through the rear opening 2B and is discharged onto the open rear cover 12. This method of discharge will be called a "straight discharge" in the present embodiment. The printer 1 can form images on sheets S while the rear cover 12 is in the open state. After forming images on the sheets S, the printer 1 can discharge the sheets S through the rear opening 2B onto the rear cover 12 while the rear cover 12 is in this open state.

To convey a sheet S back to the process member 4 after an image has been formed on one side, the first conveying roller 36 of the conveying member 3 conveys the sheet S exiting the process member 4 while the flapper 30 guides the sheet S along the first conveying path 25 or second conveying path 26. When the conveying member 3 guides the sheet S along the first conveying path 25, the second conveying roller 37 and first switchback roller 38 convey the sheet S from the first conveying path 25 onto the third conveying path 27. When the conveying member 3 has guided the sheet S onto the second conveying path 26, the second switchback roller 39 guides the sheet S from the second conveying path 26 onto the third conveying path 27.

Once conveyed onto the third conveying path 27, the sheet S is resupplied to the process member 4 by the third conveying rollers 40, the registration roller 35, and the like. After the process member 4 has formed an image on the other side of the sheet S, the conveying member 3 discharges the sheet S onto the discharge tray 22.

The process member 4 has a function to form an image on a sheet S by transferring toner images onto the sheet S. The process member 4 is provided with an exposure member 5, a drum member 6, four developing cartridges 7Y, 7M, 7C, and 7K, and a transfer member 8.

The exposure member 5 is disposed in the upper portion of the device body 2. While not shown in the drawings, the exposure member 5 is provided with a light source, a polygon mirror, lenses, reflecting mirrors, and the like. The exposure member 5 exposes the surfaces of photosensitive drums 61 described later by irradiating laser beams on their surfaces, as depicted by one-dots chain lines in FIG. 1.

The drum member 6 is disposed in the device body 2 between the supply tray 31 and the exposure member 5. The drum member 6 is provided with four photosensitive drums 61, four chargers 62, a pinch roller 64, and a support frame 65 that supports the photosensitive drums 61 and the like. While the front cover 21 is in the open state, the drum member 6 can be mounted in and removed from the device body 2 through the front opening 2A. The pinch roller 64 opposes the registration roller 35. The pinch roller 64 rotates along with the rotation of the registration roller 35 and conveys sheets S together with the registration roller 35.

The developing cartridges 7Y, 7M, 7C, and 7K correspond to the four colors yellow (Y), magenta (M), cyan (C), and black (K) and are detachably mounted in the drum member 6 in this order from front to rear. Each of the developing cartridges 7Y, 7M, 7C, and 7K is provided with a developing roller 71, a supply roller 72, and a toner container 73 accommodating toner of the corresponding color. Because each of the developing cartridges 7Y, 7M, 7C, and 7K has the same structure, differing only in the color of toner they accommodate, the following description may simply use developing cartridge 7 to refer to any of these developing cartridges 7Y, 7M, 7C, and 7K.

The transfer member 8 is disposed between the supply tray 31 and the drum member 6 in the device body 2. The transfer member 8 is provided with a drive roller 81, a follow roller 82, a conveying belt 83, and four transfer rollers 84. The conveying belt 83 is stretched around the drive roller 81 and the follow roller 82 with the upper surface of the conveying belt 83 in contact with the photosensitive drums 61. The four transfer rollers 84 are disposed inside the loop formed by the conveying belt 83 so that the conveying belt 83 is interposed between the transfer rollers 84 and the corresponding photosensitive drums 61.

The fixing device 9 is disposed in a rear space of the process member 4 inside the device body 2. Specifically, the fixing device 9 is disposed between the rear cover 12 in its closed state and the process member 4. The fixing device 9 has a heating roller 91 that heats the sheets S, and a pressing member 92 that presses the sheets S against the heating roller 91. In the present embodiment, an internal heater 93 is disposed in an internal space of the heating roller 91. The internal heater 93 is for heating the heating roller 91. While depicted without reference numerals, the pressing member 92 has an endless belt, a pressure pad for pressing the endless belt against the heating roller 91, a holder that supports the pressure pad, a belt guide, and the like.

In the process member 4 having this configuration, the chargers 62 apply a uniform charge to the surfaces of the corresponding photosensitive drums 61, and the exposure member 5 exposes the surfaces of the photosensitive drums 61 to form electrostatic latent images thereon. Toner in the toner containers 73 is supplied onto the corresponding supply rollers 72, and the supply rollers 72 supply this toner onto the corresponding developing rollers 71. The toner supplied onto the developing rollers 71 is carried on the surfaces of the developing rollers 71 as the developing rollers 71 rotate.

The toner carried on the developing rollers 71 is supplied to the electrostatic latent images on the corresponding photosensitive drums 61 to form toner images on the surfaces of the photosensitive drums 61. Subsequently, as the conveying member 3 conveys a sheet S from the supply tray 31 so that the sheet S passes between the photosensitive drums 61 and the conveying belt 83, the process member 4 transfers the toner images from the photosensitive drums 61 onto the sheet S. Thereafter, the process member 4 conveys the sheet S to the fixing device 9.

The fixing device 9 fixes the toner image transferred onto the sheet S to form an image on the sheet S as the sheet S is conveyed between the heating roller 91 and the pressing member 92.

The printer 1 is further provided with a fixing fan 13, fixing temperature sensors TH (TH1, TH2, TH3), and an AC-DC power supply board 112 inside the device body 2. The AC-DC power supply board 112 will be described later.

The fixing fan 13 is provided to discharge air from the device body 2 when driven.

The fixing temperature sensors TH detect the temperature of the fixing device 9, and more specifically the heating roller 91, and output signals corresponding to the detected temperature. The fixing temperature sensors TH are provided in the fixing device 9 so as to oppose but not contact the heating roller 91. Non-contact thermistors or the like may be used as the fixing temperature sensors TH, for example.

Figure 2:
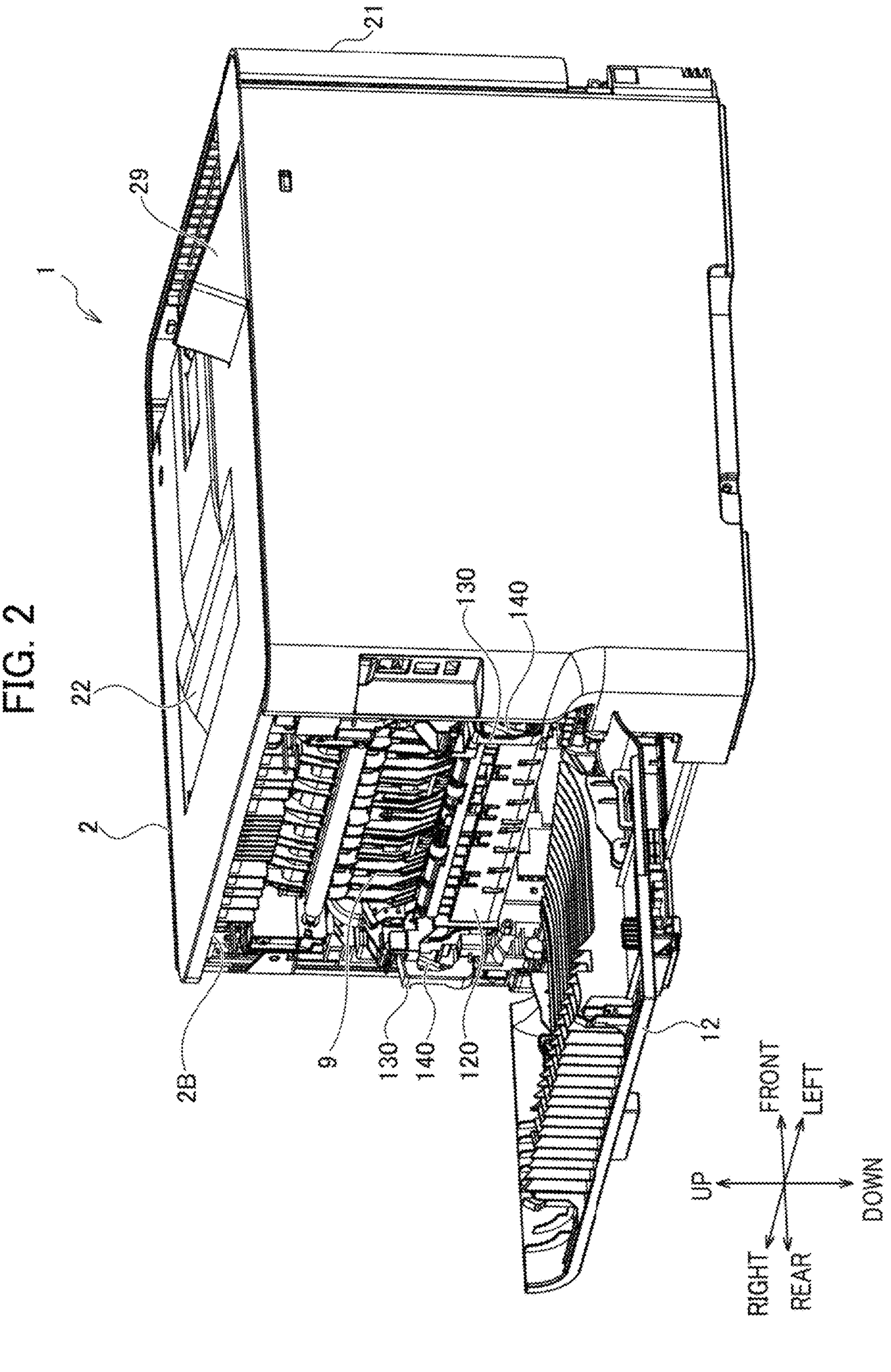
FIG. 2 is a perspective view illustrating the color laser printer shown in FIG. 1 when a rear cover is open.

By opening the rear cover 12, the fixing device 9 can be mounted into and removed from the device body 2 through the rear opening 2B formed in the device body 2. FIG. 2 shows the rear cover 12 in its open state. As shown in FIG. 2, the fixing device 9 is provided with an enclosure 120, handles 130, and levers 140. The handles 130 are provided one on each of the left and right ends of the enclosure 120, and a lever 140 is attached to each handle 130.

Figure 3:
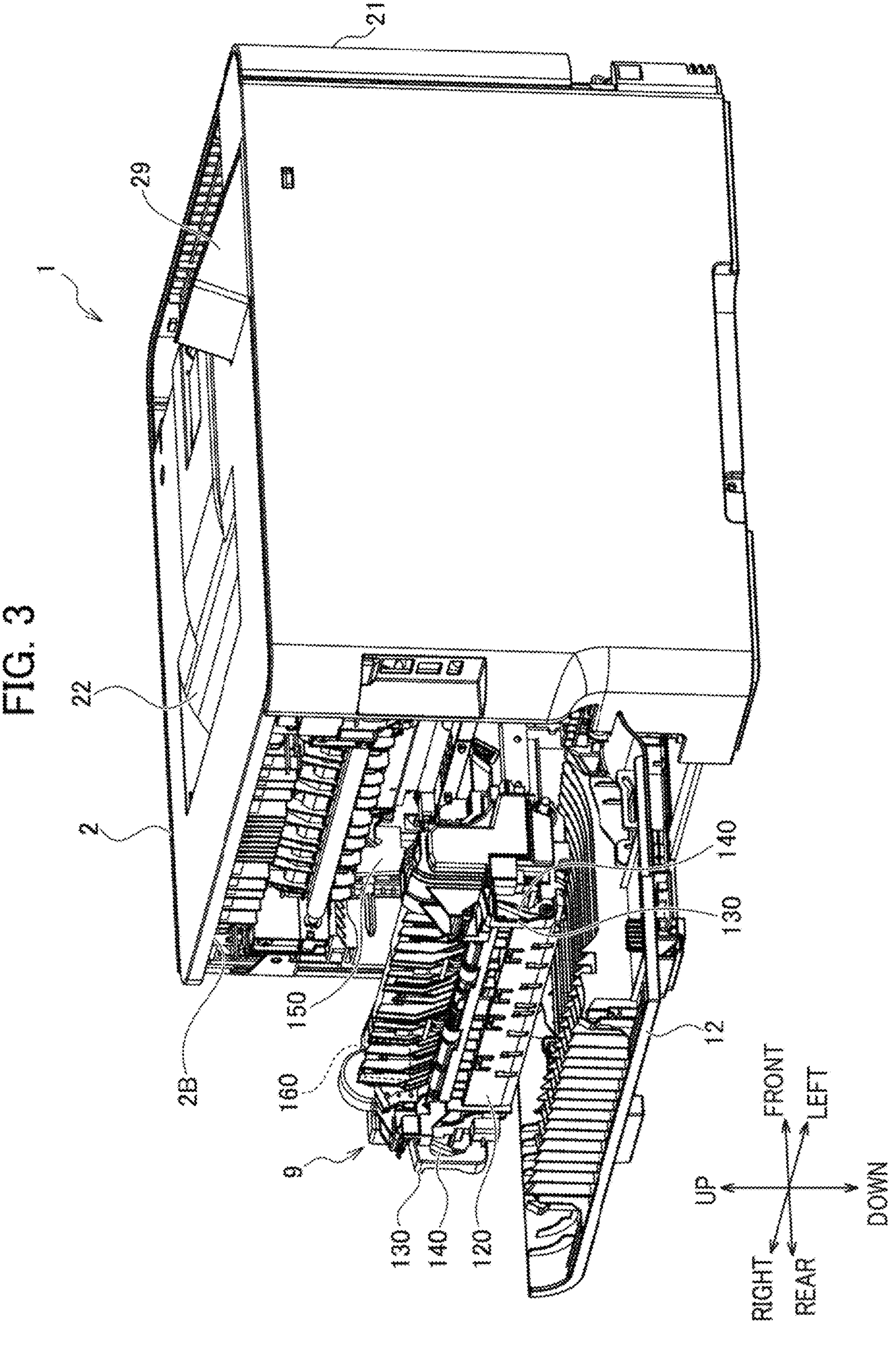
FIG. 3 is a perspective view illustrating the color laser printer when a fixing device is removed from the color laser printer in a state shown in FIG. 2.

As illustrated in FIG. 3, the user can remove the fixing device 9 from the device body 2 by grasping the levers 140 and pulling the handles 130 rearward. At this time, a component-side connector 160 (FIG. 5) provided in the fixing device 9 is detached from a device-side connector 150 (FIG. 5) provided in the device body 2. That is, the component-side connector 160 and device-side connector 150 are connected to each other when the fixing device 9 is mounted in the device body 2 and disconnected from each other when the fixing device 9 is removed from the device body 2.

Figure 4A:
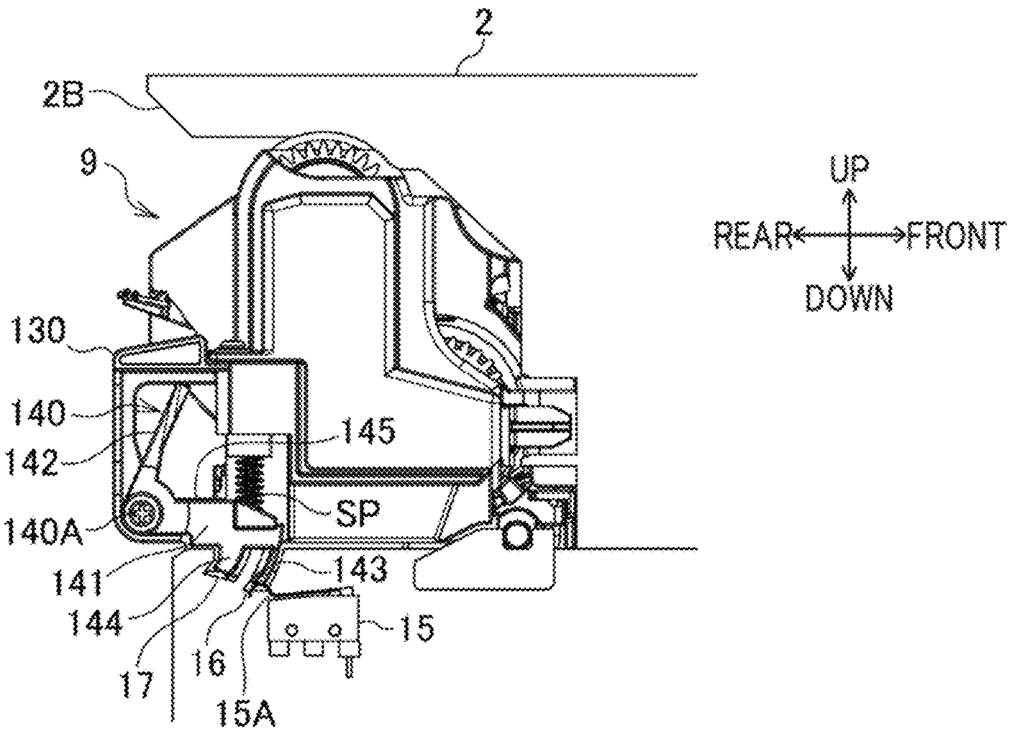
FIG. 4A is a side view illustrating a lever in a first position when the fixing device is in a mounted position.
Figure 4B:
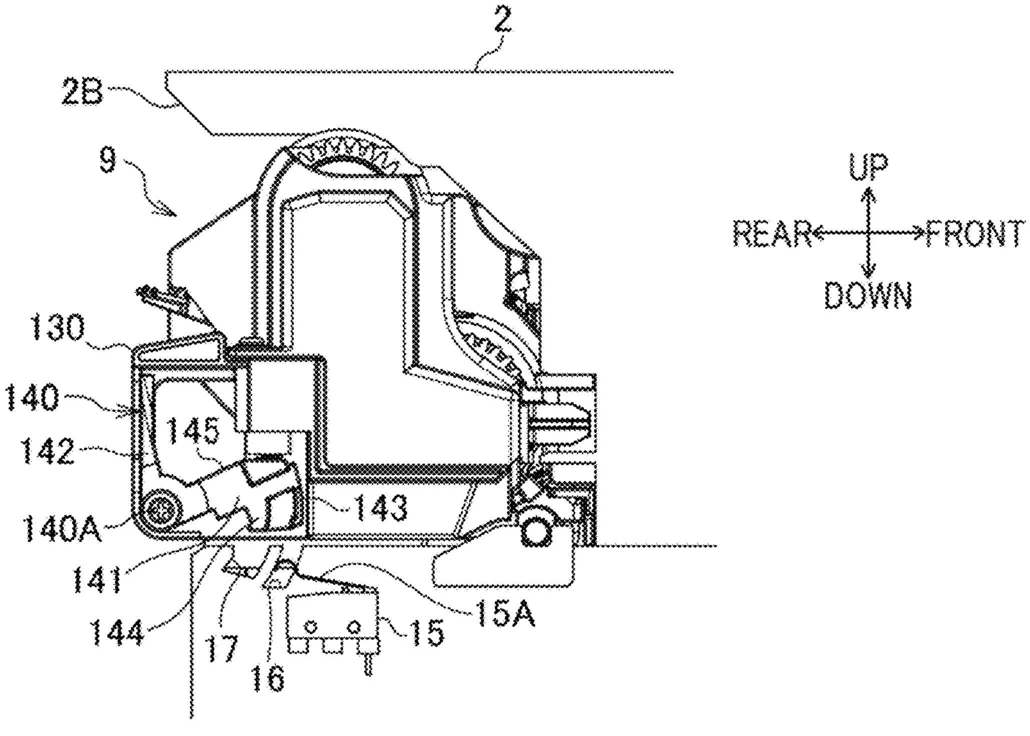
FIG. 4B is a side view illustrating the lever in a second position when the fixing device is in a mounted position.

As shown in FIGS. 4A and 4B, each lever 140 is formed in an L-shape and is rotatable about a lever shaft 140A between a first position shown in FIG. 4A and a second position shown in FIG. 4B. The axial direction of the lever shaft 140A in the present embodiment coincides with the width direction of the sheet S, i.e., the left-right direction. A spring SP is disposed between the handle 130 and the lever 140. The spring SP is a compression spring that constantly urges the lever 140 from the second position toward the first position.

Each lever 140 has a body 141, a grip part 142, an engaging part 144, and a pressure receiving part 145. Of the two levers 140 provided on left and right ends of the enclosure 120, one of the levers 140 (e.g., the left lever 140) has a switch contact part 143 but a remaining one (e.g., the right lever 140) has no switch contact part 143.

The body 141 extends forward from the lever shaft 140A, and the grip part 142 extends upward from the lever shaft 140A. In other words, the grip part 142 extends in a direction different than (or crossing) that of the body 141 and forms an L-shape together with the body 141. The user grips the grip parts 142 when removing the fixing device 9 from the device body 2. When the user grips both the grip parts 142 and the handles 130, and brings the grip parts 142 toward the handles 130, the levers 140 move from the first position shown in FIG. 4A to the second position shown in FIG. 4B. In other words, the grip parts 142 are positioned closer to the handles 130 when the levers 140 are in the second position than when the levers 140 are in the first position.

The switch contact part 143 is a protrusion that extends downward from the first portion of the corresponding body 141. The switch contact part 143 protrudes in the rotating direction of the lever 140. When the corresponding lever 140 is in the first position shown in FIG. 4A, the switch contact part 143 is accommodated in a switch slot 16 formed in the device body 2. When entering the switch slot 16, the switch contact part 143 contacts an arm 15A of a fixing device detection switch 15.

When the fixing device 9 is mounted in the device body 2 and the user is no longer gripping the grip parts 142, the levers 140 are in the first position shown in FIG. 4A and the switch contact part 143 is in contact with the arm 15A of the fixing device detection switch 15. At this time, the fixing device detection switch 15 is in an ON state (a first state). On the other hand, when the fixing device 9 is mounted in the device body 2 and the user is gripping the grip parts 142, as illustrated in FIG. 4B, the levers 140 are rotated into the second position and the switch contact part 143 is separated from the arm 15A of the fixing device detection switch 15. At this time, the fixing device detection switch 15 is in an OFF state (a second state).

The engaging part 144 is a protrusion that extends downward from the middle portion of each body 141 in the front-rear direction. The engaging part 144 protrudes in the rotating direction of the lever 140. In the present embodiment, the engaging part 144 has a hook shape with a distal end curved toward the direction in which the fixing device 9 is removed from the device body 2.

When the lever 140 is in the first position shown in FIG. 4A, the engaging part 144 is accommodated in an engagement hole 17 formed in the device body 2. When entering the engagement hole 17, the engaging part 144 becomes engaged with the device body 2. When engaged with the device body 2, the engaging part 144 restricts the fixing device 9 from being removed from the device body 2. On the other hand, when the lever 140 is in the second position shown in FIG. 4B, the engaging part 144 is not engaged with the device body 2 and does not restrict the fixing device 9 from being removed from the device body 2.

Figure 5:
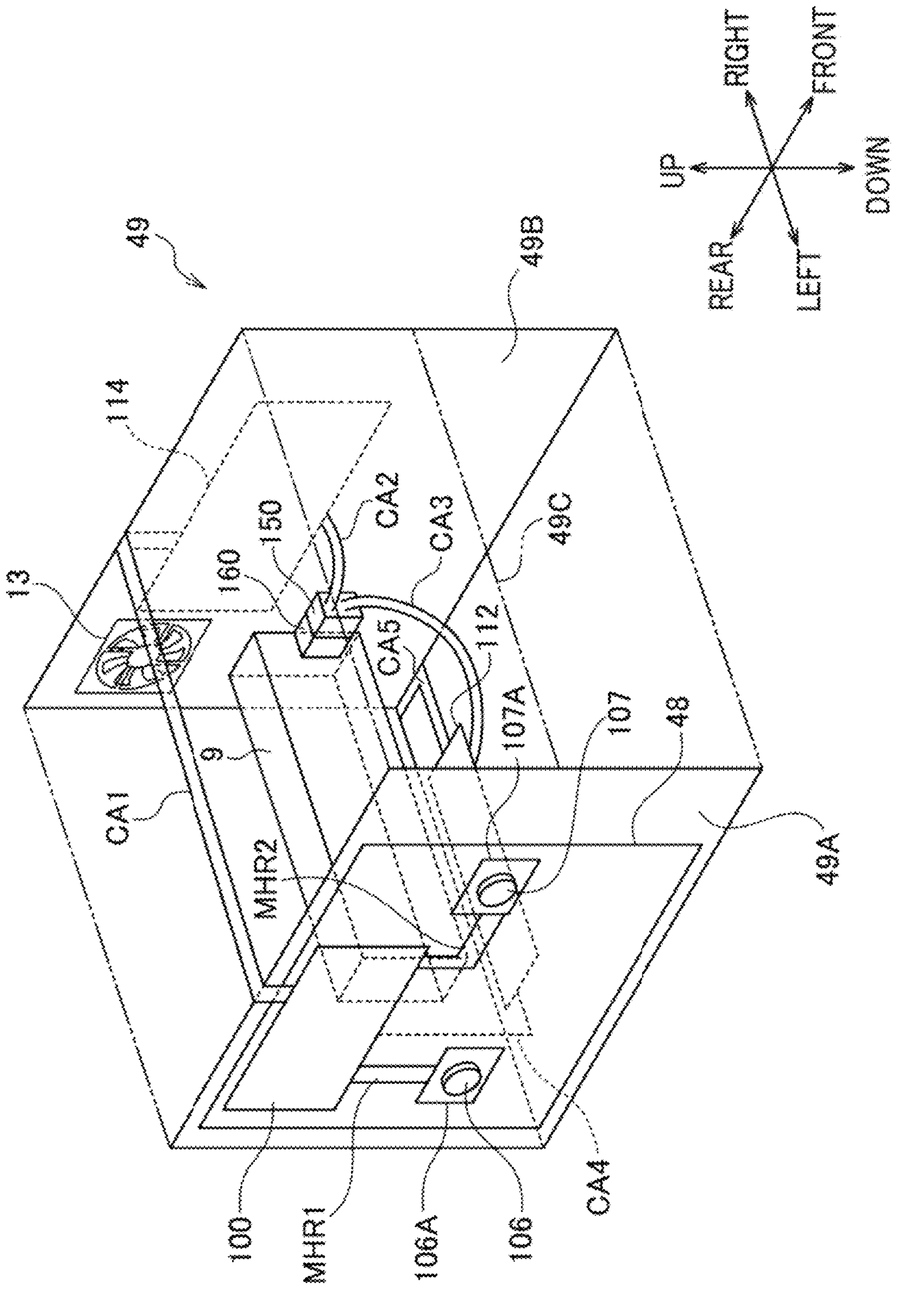
FIG. 5 is a perspective view of the color laser printer schematically illustrating an internal configuration of the color laser printer shown in FIG. 1.

Next, the internal structure of the printer 1 will be described with reference to FIG. 5. FIG. 5 shows primarily those components required for describing this embodiment and omits other components of the printer 1.

As shown in FIG. 5, the printer 1 is provided with a sheet metal frame 48, a first resin frame 49A, a second resin frame 49B, and a support frame 49C inside the device body 2. The first resin frame 49A, second resin frame 49B, and support frame 49C constitute a device frame 49. The first resin frame 49A and second resin frame 49B are connected via the support frame 49C. When their corresponding vertices are connected, the first resin frame 49A and second resin frame 49B form a rectangular parallelepiped shape. In other words, the device frame 49 having the first resin frame 49A, the second resin frame 49B, and the support frame 49C defines the rectangular parallelepiped shape. Hereinafter, the interior of this rectangular parallelepiped shape will be called the interior of the device frame 49, while the exterior of this rectangular parallelepiped shape will be called the exterior of the device frame 49. Note that the sheet metal frame 48 is grounded. The first resin frame 49A, second resin frame 49B, and support frame 49C are made of resin in this embodiment, but may be made of other materials, such as metal.

A main board 100, a main motor 106, and a process motor 107 are provided on the left side surface of the sheet metal frame 48. That is, the main board 100, the main motor 106, and the process motor 107 are located on the outer left side of the device frame 49. The main motor 106 is mounted on a main motor board 106A, and the process motor 107 is mounted on a process motor board 107A. The main board 100 and the main motor board 106A are connected via a first motor harness MHR1, and the main board 100 and the process motor board 107A are connected via a second motor harness MHR2. Driving the main motor 106 causes the heating roller 91 of the fixing device 9 and the rollers in the conveying member 3 to rotate. Driving the process motor 107 causes the photosensitive drums 61 and the developing rollers 71 to rotate.

The fixing fan 13 is provided in the second resin frame 49B. Further, a high-voltage power supply board 114 is disposed on the right side surface of the second resin frame 49B. In other words, the fixing fan 13 and the high-voltage power supply board 114 are located on the right side of the device frame 49. The high-voltage power supply board 114 supplies high voltages HV, such as developing voltages and charging voltages (see FIG. 7), to the process member 4. The high-voltage power supply board 114 has a high-voltage generator circuit 114C (see FIG. 6). The high-voltage generator circuit 114C generates a high voltage HV of around 1 kV, for example, based on a DC voltage such as 24 VDC supplied from an AC-DC power supply board 112 (described later) via the main board 100. The high-voltage generator circuit 114C then supplies this high voltage HV to the process member 4.

The left side of the device frame 49 is packed with the drive systems, including the main motor 106, the process motor 107, and gears (not shown). However, the main board 100 must also be arranged on the left side of the device frame 49 because the main board 100 needs to be near the motors 106 and 107. In contrast, the right side of the device frame 49 is relatively uncluttered despite the presence of the high-voltage power supply board 114. Therefore, the device-side connector 150 is located on the right side of the device frame 49, i.e., on the right side of the device body 2. Naturally, this positioning also determines the position of the component-side connector 160, which must be in a location on the fixing device 9 for mating with the device-side connector 150 when the fixing device 9 is mounted in the device body 2. In other words, the component-side connector 160 is arranged on the right end of the enclosure 120, as shown in FIG. 3.

The main board 100 and the high-voltage power supply board 114 are connected via first connection lines CA1. Because the high-voltage power supply board 114 is controlled by an ASIC 101 (see FIG. 6) mounted on the main board 100, control signals must be exchanged between the main board 100 and the high-voltage power supply board 114. The first connection lines CA1 function to transmit these control signals. Because there is a plurality of control signals, a plurality of signal lines is needed to transmit these control signals. Therefore, the first connection lines CA1 are configured as a harness that bundles a plurality of signal lines. Further, the first connection lines CA1 employ a flat cable shape in order to minimize the volume of the cable path and suppress the size of the device body 2.

As described above, the main board 100 is disposed on the left side of the device frame 49 and the high-voltage power supply board 114 is disposed on the right side of the device frame 49. Accordingly, the first connection lines CA1 connecting the main board 100 and high-voltage power supply board 114 must cross the device frame 49 from left to right. In the example of FIG. 5, the first connection lines CA1 are arranged along the inner top surface of the device body 2, but the first connection lines CA1 may be arranged along the inner bottom surface of the device body 2 instead.

The AC-DC power supply board 112 is arranged in the rear bottom region of the interior space defined by the device frame 49. The AC-DC power supply board 112 is positioned beneath the fixing device 9 and extends in the left-right direction parallel to the bottom surface of the interior space defined by the device frame 49. In other words, the AC-DC power supply board 112 is parallel to the bottom surface of the main body 2. As shown in FIG. 6, the AC-DC power supply board 112 has an AC-DC convertor circuit 112C, which receives AC voltage, such as 100 VAC, from a commercial power supply as input and converts the 100 VAC to DC voltage, such as 24 VDC. The AC-DC power supply board 112 is connected to the main board 100 via fourth connection lines CA4 and outputs the generated 24 VDC to the main board 100.

As shown in FIG. 6, the main board 100 has a DC-DC convertor circuit 102 that converts the 24 VDC inputted from the AC-DC power supply board 112 to 3.3 VDC, for example. The 3.3 VDC is the voltage required to drive the various electronic components (for example an ASIC 101 described later) mounted on the main board 100. However, in a case that the main board 100 has electronic components that are driven by other DC voltage values, such as 5 VDC, the main board 100 may be provided with a plurality of DC-DC converter circuits for generating 5 VDC and other values in addition to 3.3 VDC.

The AC-DC power supply board 112 is also connected to the device-side connector 150 via third connection lines CA3 and is connected to an inlet 200 (see FIG. 6) via fifth connection lines CA5. The inlet 200 serves to input AC voltage supplied from a commercial power source (100 VAC). The inlet 200 supplies this AC voltage to the fixing device 9 via the fifth connection lines CA5, the AC-DC power supply board 112, the third connection lines CA3, the device-side connector 150, and the component-side connector 160. The inlet 200 is provided on the rear side of the second resin frame 49B. Therefore, the AC-DC power supply board 112 converts AC voltage inputted from the right side of the device body 2 to DC voltage (24 V) and outputs this DC voltage to the main board 100 on the left side of the device body 2 via the fourth connection lines CA4.

FIG. 6 illustrates some of the signal transmission paths in the printer 1. As shown in FIG. 6, the ASIC 101 is mounted on the main board 100. The ASIC 101 is an example of a controller or a processor. While not shown in the drawings, the ASIC 101 has a CPU, ROM, RAM, and input/output circuits. The ASIC 101 performs various arithmetic processes based on programs and data stored in the ROM and the like to achieve overall control of the printer 1, including the process member 4.

In addition to the ASIC 101, the main board 100 is provided with a motor drive circuit MD (an example of a motor drive member) for driving the main motor 106, a switching circuit 103 (on/off circuit) (an example of a switching member) that switches the supply of 24 VDC to the high-voltage generator circuit 114C of the high-voltage power supply board 114 on and off, a detection circuit 104 (an example of a detection member) that detects whether the fixing device detection switch 15 described above is in the ON or OFF state, and the aforementioned DC-DC convertor circuit 102.

The AC-DC convertor circuit 112C of the AC-DC power supply board 112 is connected to the DC-DC convertor circuit 102 via a power line PL. Note that this part of the power line PL connecting the AC-DC convertor circuit 112C to the DC-DC convertor circuit 102 is included in the fourth connection lines CA4 described above. The power line PL branches at a branch point BP0 on the main board 100 prior to being inputted into the DC-DC convertor circuit 102, and this branch extension connects to the input side of the fixing device detection switch 15.

The output side of the fixing device detection switch 15 is connected to the input side of the switching circuit 103 via a power line PL. At a first branch point BP1 between the output side of the fixing device detection switch 15 and the input side of the switching circuit 103, the power line PL branches and connects to the input side of the motor drive circuit MD. At a second branch point BP2 positioned between the output side of the fixing device detection switch 15 and the input side of the switching circuit 103 and on the downstream side of the first branch point BP1, the power line PL branches and connects to the input side of the detection circuit 104.

Figure 7:
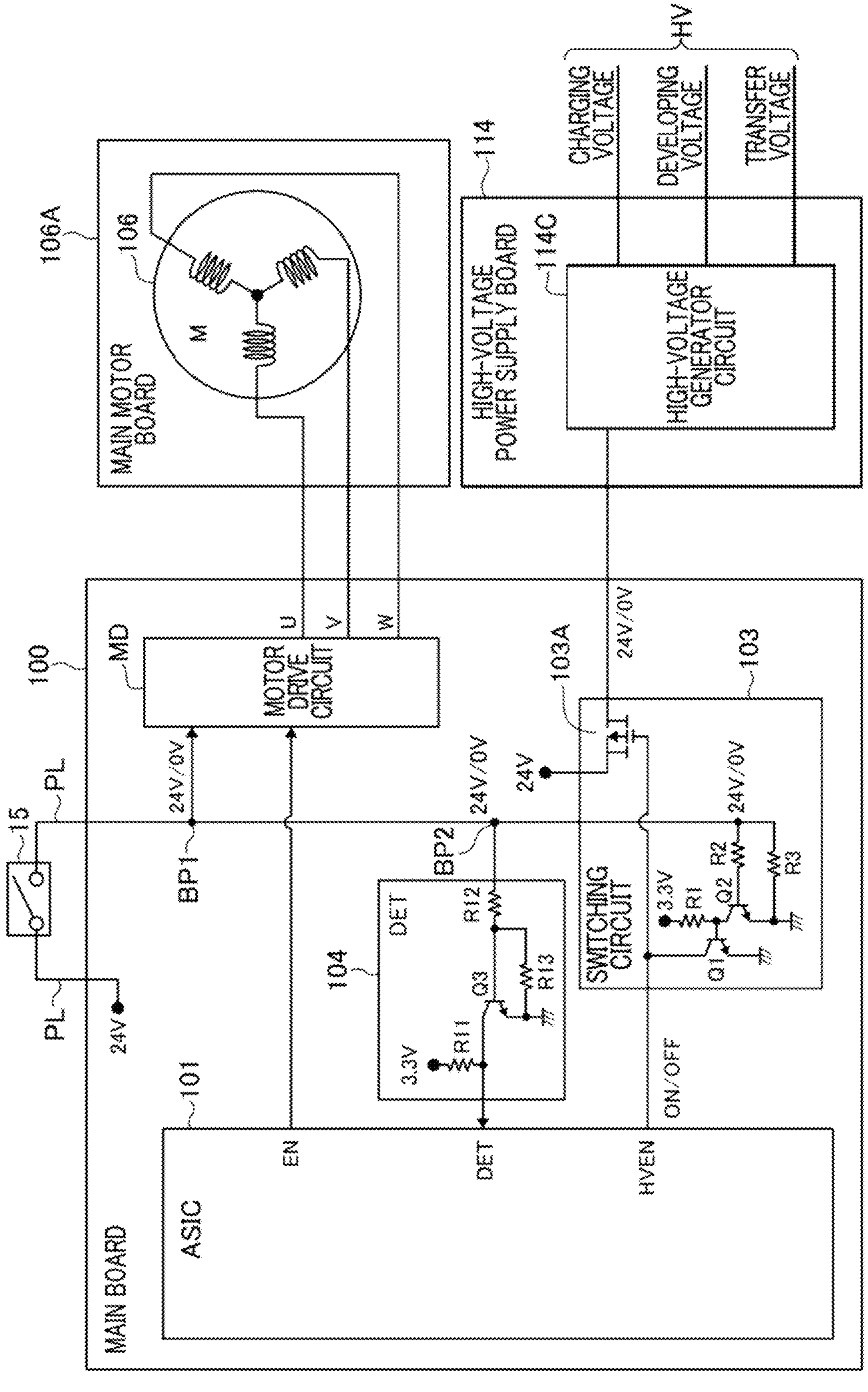
FIG. 7 is a block diagram illustrating detailed configuration of part of circuits in a main circuit board shown in FIG. 6.

The output side of the motor drive circuit MD is connected to the main motor 106. As shown in FIG. 7, the voltage applied to the first branch point BP1 on the power line PL is supplied to the motor drive circuit MD. Because the output voltage from the fixing device detection switch 15 is applied to the first branch point BP1, 24 VDC is applied to the first branch point BP1 when the fixing device detection switch 15 is ON and 0 V is applied to the first branch point BP1 when the fixing device detection switch 15 is OFF.

As shown in FIG. 7, an EN signal from the output port EN of the ASIC 101 is inputted into the motor drive circuit MD. The EN signal serves to enable or disable the motor drive circuit MD. For example, the motor drive circuit MD is in an operable state when the value of the EN signal is high and is in an inoperable state when the value of the EN signal is low. However, in a case that 24 VDC is not being applied to the motor drive circuit MD, the motor drive circuit MD does not operate even when a high EN signal is inputted into the motor drive circuit MD. In other words, the motor drive circuit MD begins to operate when a high EN signal is inputted while 24 VDC is being applied to the motor drive circuit MD, and the motor drive circuit MD halts operations when a low EN signal is inputted while 24 VDC is being applied to the motor drive circuit MD. Further, the motor drive circuit MD stops operating when 0 V is applied, regardless the value of the EN signal. The method by which the motor drive circuit MD controls the main motor 106 is well known and will not be described herein.

Returning to FIG. 6, the output side of the switching circuit 103 is connected to the power supply voltage input side of the high-voltage generator circuit 114C on the high-voltage power supply board 114. A control signal is also inputted into the high-voltage generator circuit 114C from the output port (not shown) of the ASIC 101. The high-voltage generator circuit 114C has a booster circuit with a transformer and a transformer drive circuit, for example. As described above, the high-voltage generator circuit 114C boosts the inputted 24 VDC based on the inputted control signal to generate high voltage HV, and supplies the generated high voltage HV, and specifically the charging voltage, developing voltage, and transfer voltage (see FIG. 7), to the process member 4.

In addition to the 24 VDC output voltage that the fixing device detection switch 15 supplies to the switching circuit 103, the ASIC 101 inputs an HVEN signal into the switching circuit 103. As shown in FIG. 7, the switching circuit 103 is configured of two NPN transistors Q1 and Q2, one P-channel MOSFET 103A, and three resistors R1-R3. The base of the transistor Q1 is connected to 3.3 VDC via resistor R1 and is connected to the collector of the transistor Q2. The collector of the transistor Q1 is connected to an output port HVEN of the ASIC 101 and is also connected to the gate of the FET 103A. Further, the emitter of the transistor Q1 is grounded. The base of the transistor Q2 is connected to the output side of the fixing device detection switch 15 via resistor R2, and the emitter of the transistor Q2 is grounded. The second branch point BP2 is grounded through resistor R3. In other words, the line from the fixing device detection switch 15 is divided into the line with the register R2 and the line with the register R3. 24 VDC is applied to the source of the FET 103A, and the supply voltage input side of the high-voltage generator circuit 114C is connected to the drain of the FET 103A.

The ASIC 101 outputs the HVEN signal to the switching circuit 103 from the output port HVEN. The HVEN signal is used for controlling the switching circuit 103 and takes either a ON (high) or OFF (low) value. The output voltage from the fixing device detection switch 15 is applied to the base of transistor Q2 via the resistor R2.

When 24 VDC is applied to the second branch point BP2, the voltage value across the base and the emitter of the transistor Q2 becomes greater than a prescribed value, i.e., a value required to turn on the transistor Q2. Hence, the transistor Q2 turns on. Since this causes electric current to flow in a direction from the collector of transistor Q2 to the emitter, the potential of the collector approaches ground potential. Consequently, the voltage applied to the base of transistor Q1 is approximately 0 V, turning the transistor Q1 off. When the ASIC 101 outputs an HVEN signal at this time, the value of the HVEN signal (i.e., ON or OFF) is inputted directly into the gate of the FET 103A. Hence, when the HVEN signal is ON, the FET 103A turns on and the 24 VDC applied to the source of the FET 103A is outputted unchanged from the drain of the FET 103A. Accordingly, 24 VDC is applied to the power supply input side of the high-voltage generator circuit 114C. On the other hand, when the HVEN signal is OFF at this time, the FET 103A turns off, and the 24 VDC applied to the source of the FET 103A is not outputted from the FET 103A. Consequently, the power supply input side of the high-voltage generator circuit 114C remains at 0 V.

In contrast, when 0 V is applied to the second branch point BP2, the voltage value across the base and emitter of the transistor Q2 is 0 V and, hence, the transistor Q2 is off. As a result, no current flows toward the emitter from the collector of the transistor Q2. Hence, the potential of the collector of the transistor Q2 is pulled up to 3.3 VDC, and the base of the transistor Q1, which has the same potential as the collector of transistor Q2, becomes 3.3 VDC. Accordingly, the transistor Q1 is turned on. When the ASIC 101 outputs an HVEN signal at this time and the value of the HVEN signal is ON (high), current flows toward the emitter from the collector of transistor Q1 so that the potential of the collector approaches ground potential. Consequently, a low HVEN signal is inputted into the gate of the FET 103A. Therefore, the FET 103A is turned off, and the 24 VDC applied to the source of the FET 103A is not outputted from the drain of the FET 103A. Accordingly, the supply voltage input side of the high-voltage generator circuit 114C remains at 0 V. On the other hand, when the HVEN signal is OFF at this time, the FET 103A is turned off and the 24 VDC applied to the source of the FET 103A is not outputted from the drain of the FET 103A. Accordingly, the power supply voltage input side of the high-voltage generator circuit 114C remains at 0 V.

The following table summarizes the states of the HVEN signal, the fixing device detection switch 15, and the switching circuit 103 described above.

TABLE 1

| HVEN signal | Switch 15 | Switching circuit 103 |
|---|---|---|
| ON | 24 V input | 24 V output |
| OFF | 24 V input | 0 V output |
| ON | 0 V input | 0 V output |
| OFF | 0 V input | 0 V output |

In other words, when 24 VDC is inputted from the fixing device detection switch 15, the switching circuit 103 switches whether 24 VDC is inputted into the high-voltage generator circuit 114C, depending on the value of the HVEN signal outputted from the ASIC 101.

Returning to FIG. 6, the output side of the detection circuit 104 is connected to an input port (not shown) of the ASIC 101. As shown in FIG. 7, the detection circuit 104 is configured of a single NPN transistor Q3, and three resistors R11-R13. The base of the transistor Q3 is connected to the second branch point BP2 of the power line PL through the resistor R12 and is grounded via the resistor R13. The emitter of the transistor Q3 is also grounded, while the collector of the transistor Q3 is connected to 3.3 VDC via the resistor R11 and is connected to an input port DET of the ASIC 101.

When the fixing device detection switch 15 is turned on and 24 VDC is applied to the second branch point BP2, the voltage value across the base and emitter of the transistor Q3 is greater than or equal to a prescribed value, i.e., the value for turning on the transistor Q3. Accordingly, the transistor Q3 is turned on, whereby current flows toward the emitter from the collector of the transistor Q3, causing the potential of the collector to approach ground potential. Accordingly, the ASIC 101 recognizes that the detection signal DET outputted from the detection circuit 104 is low. On the other hand, when the fixing device detection switch 15 is off and 0 V is applied to the power line PL, the voltage value across the base and emitter of the transistor Q3 is 0 V, and transistor Q3 is off. As a result, electric current does not flow toward the emitter from the collector of the transistor Q3 and the potential of the collector is pulled up to 3.3 VDC. At this time, the ASIC 101 recognizes that the detection signal DET outputted from the detection circuit 104 is high. In this way, the ASIC 101 determines that the fixing device detection switch 15 is on when the detection signal DET from the detection circuit 104 is low and determines that the fixing device detection switch 15 is off when the detection signal DET from the detection circuit 104 is high.

Returning to FIG. 6, an input port (not shown) of the ASIC 101 is connected to the output side of a rear cover open/close detection switch 14. The rear cover open/close detection switch 14 is provided near the rear cover 12 and outputs a rear cover open/close signal indicating a different value depending on whether the rear cover 12 is open or closed. Hence, the ASIC 101 can determine whether the rear cover 12 is in an open state or a closed state by referencing the value of this rear cover open/close signal.

The main board 100 is connected to the high-voltage power supply board 114 via a connector 100A on the main board 100 side, the first connection lines CA1, and a connector 114A on the high-voltage power supply board 114 side. The high-voltage power supply board 114 is connected to the device-side connector 150 via a connector 114B on the high-voltage power supply board 114 side and second connection lines CA2.

As described above, the device body 2 is provided with the inlet 200. An AC voltage supplied from the inlet 200 is inputted into the AC-DC power supply board 112 via a connector 112A on the AC-DC power supply board 112 side. The AC-DC power supply board 112 is connected to the device-side connector 150 via a connector 112B on the AC-DC power supply board 112 side, and the third connection lines CA3.

The device-side connector 150 is connected to the component-side connector 160. The component-side connector 160 is connected to a fixing device relay board 115 via a connector 115A on the fixing device relay board 115 side. As described above, the fixing device 9 is provided with a heater 93. An AC voltage inputted from the inlet 200, such as 100 VAC, is supplied to the heater 93 via the AC-DC power supply board 112, the third connection lines CA3, the device-side connector 150, and the component-side connector 160.

The heater 93 is heated by the 100 VAC supplied as described above. When 100 VAC is supplied to the heater 93, the ASIC 101 controls the on/off timing of the 100 VAC being supplied to the heater 93 in order to control the heating temperature. As described above, the fixing temperature sensors TH are provided for controlling this heating temperature. In the example of FIG. 6, the fixing temperature sensors TH include three temperature sensors TH1-TH3. The temperature sensors TH1-TH3 are positioned to detect temperatures respectively at the left end, center, and right end of the heating roller 91, which is elongated in the left-right direction.

The temperature sensors TH1 and TH3 operate at 3.3 VDC, and the temperature sensor TH2 operates at 1.8 VDC. Accordingly, the fixing device relay board 115 supplies 3.3 VDC to the temperature sensors TH1 and TH3 that detect the temperature on respective left and right ends of the heating roller 91, and supplies 1.8 V to the temperature sensor TH2, which detects the temperature in the center of the heating roller 91. One reason for using temperature sensors TH1-TH3 with different operating voltages is that when the operating mode of the printer 1 enters the sleep mode, the fixing device relay board 115 can halt the supply of 3.3 VDC while maintaining the supply of 1.8 VDC. Accordingly, one temperature sensor can be kept in operation even when the printer 1 is in the sleep mode.

As described above, the ASIC 101 of the main board 100 controls the heating temperature of the heater 93. Therefore, signals THM1-THM3 indicating the temperatures detected by the respective temperature sensors TH1-TH3 inside the fixing device 9 must be transmitted from the fixing device 9 to the main board 100. For this reason, new signal lines connecting the device-side connector 150 to the main board 100 must be provided. Because the device-side connector 150 is provided on the right side of the device body 2 and the main board 100 is provided on the left side of the device body 2, the new connection lines must cross the device frame 49 from left to right, as do the first connection lines CA1. However, there is little room in the device body 2 to provide more connection lines like the first connection lines CA1. Therefore, signal lines that transmits the detection signals THM1-THM3 generated in the fixing device 9 are included in the first connection lines CA1. Thus, the detection signals THM1-THM3 generated in the fixing device 9 can be transmitted to the main board 100 simply by providing short new connection lines, and specifically the second connection lines CA2 connecting the device-side connector 150 to the high-voltage power supply board 114 located near the device-side connector 150.

As shown in FIG. 6, the signals THM1-THM3 are transmitted to the main board 100 via the fixing device relay board 115, the component-side connector 160, the device-side connector 150, the second connection lines CA2, the high-voltage power supply board 114, and the first connection lines CA1. The ASIC 101 of the main board 100 then controls the on/off timing of the 100 VAC supplied to the heater 93 based on the signals THM1-THM3 outputted from the temperature sensors TH1-TH3.

The AC-DC power supply board 112 is provided with a circuit that includes a switching element 112E, and specifically a TRIAC or the like, that turns the 100 VAC supplied to the heater 93 on and off. By controlling the switching element 112E, the ASIC 101 controls the phase and/or wavenumber of the 100 VAC to adjust the amount of power supplied to the heater 93. The AC-DC power supply board 112 is also provided with a relay 112D that switches the input of 100 VAC on and off. The ASIC 101 outputs a relay ON/OFF signal from an output port (not shown) to the AC-DC power supply board 112 to control the ON/OFF state of the relay 112D. ON/OFF control of the relay 112D will be described below with reference to FIG. 8.

Next, a control process (printing process) executed by the printer 1 having the above configuration will be described with reference to FIG. 8.

Figure 8:
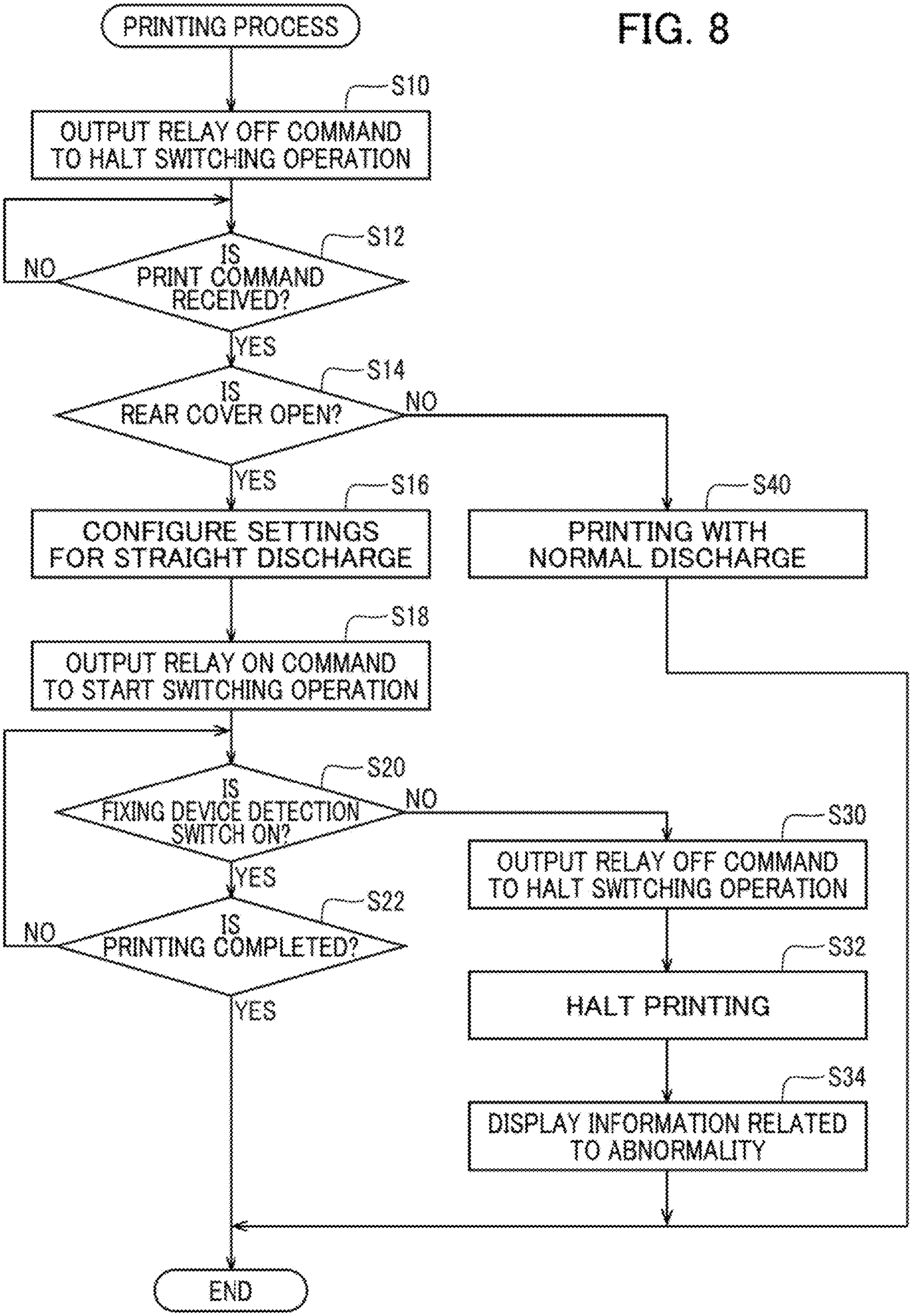
FIG. 8 is a flowchart illustrating a control process performed by an ASIC on the main circuit board shown in FIG. 6.

FIG. 8 shows steps in a printing process executed by the ASIC 101 of the printer 1. The ASIC 101 begins this printing process when the power to the printer 1 is turned on, or when the printer 1 enters the standby state. In the following description, a step is represented by "S".

In S10 of FIG. 8, the ASIC 101 first outputs an OFF command to the relay 112D and halts the switching operation of the switching element 112E. This switches the relay 112D to the OFF state when the relay 112D is operating normally, and application of AC voltage to the heater 93 is interrupted even when the AC voltage supplied from the inlet 200 is inputted into the AC-DC power supply board 112 via the connector 112A. Additionally, application of AC voltage to the heater 93 is also interrupted when the switching element 112E is operating normally.

Next, the ASIC 101 waits until a print command is received (S12: NO). Once a print command has been received (S12: YES), in S14 the ASIC 101 determines whether the rear cover 12 is open. The ASIC 101 may make this determination based on the value of the rear cover open/close signal received from the rear cover open/close detection switch 14 described above. When the ASIC 101 determines that the rear cover 12 is closed (S14: NO), in S40 the ASIC 101 performs a normal print for discharging printed sheets S into the discharge tray 22, and subsequently ends the printing process.

However, when the ASIC 101 determines in S14 that the rear cover 12 is open (S14: YES), in S16 the ASIC 101 configures settings for the straight discharge. The rear cover 12 is open when image formation is performed on sheets S for the straight discharge, as described above. Accordingly, temperature control for the heater 93 of the fixing device 9 differs from that in a normal print, in which images are formed on sheets S while the rear cover 12 is closed. For this reason, the ASIC 101 must adjust settings to perform temperature control for the straight discharge.

In S18 the ASIC 101 outputs an ON command to the relay 112D and starts the switching operation of the switching element 112E. In S20 the ASIC 101 determines whether the fixing device detection switch 15 is on. When the ASIC 101 determines that the fixing device detection switch 15 is on (S20: YES), i.e., when the fixing device 9 is mounted in the device body 2, in S22 the ASIC 101 determines whether printing is completed and continues to repeat the determination in S20 while printing is not completed (S22: NO). Once printing is completed (S22: YES), the ASIC 101 ends the printing process of FIG. 8.

On the other hand, when the ASIC 101 determines in S20 that the fixing device detection switch 15 is off (S20: NO), i.e., when the fixing device 9 has been removed from the device body 2, in S30 the ASIC 101 outputs an OFF command to the relay 112D and halts the switching operation of the switching element 112E, as described above in S10. In S32 the ASIC 101 halts printing. In S34 the ASIC 101 displays information on a display 29 (FIG. 2) such as information related to an occurrence and/or type of the abnormality, such as information indicating that the fixing device 9 was removed during printing, and subsequently ends the printing process. In addition to the process of S34, the ASIC 101 may set the EN signal described above (see FIG. 7) to low and output this signal to the motor drive circuit MD.

As described above, the printer 1 according to the embodiment is provided with the device body 2 having the rear opening 2B; the rear cover 12 capable of opening and closing the rear opening 2B in the device body 2; the process member 4 that forms a developer image on a sheet S; the fixing device 9 that fixes a developer image formed on the sheet S by the process member 4 and that can be removed from the device body 2 through the rear opening 2B when the rear cover 12 is in the open state; the AC-DC convertor circuit 112C that outputs power; the registration roller 35 that conveys the sheet toward the process member 4 and the fixing device 9; the main motor 106 that drives the registration roller 35 to rotate; the motor drive circuit MD that rotates the main motor 106 using power inputted from the AC-DC convertor circuit 112C; and the fixing device detection switch 15 that is in the first state when the fixing device 9 is mounted in the device body 2 and the second state when the fixing device 9 is removed from the device body 2. One feature of the embodiment is that when the fixing device detection switch 15 is in the first state, the AC-DC convertor circuit 112C and motor drive circuit MD are in the connected state, allowing power to be inputted from the AC-DC convertor circuit 112C into the motor drive circuit MD. When the fixing device detection switch 15 is in the second state, the AC-DC convertor circuit 112C and motor drive circuit MD are in a disconnected state, interrupting the input of power from the AC-DC convertor circuit 112C to the motor drive circuit MD.

Thus, the printer 1 according to the above embodiment is provided with the fixing device detection switch 15 that is on (the first state) when the fixing device 9 is mounted in the device body 2 and off (the second state) when the fixing device 9 is removed from the device body 2, regardless of whether the rear cover 12 is open or closed. Because power can be inputted from the AC-DC convertor circuit 112C into the motor drive circuit MD when this fixing device detection switch 15 is in the first state, regardless of whether the rear cover 12 is open or closed, the printer 1 can discharge sheets S conveyed through the process member 4 and fixing device 9 onto the rear cover 12 even when the rear cover 12 of the printer 1 is in the open state. Conversely, when the user has removed the fixing device 9 with the rear cover 12 being in the open state, the fixing device detection switch 15 of the printer 1 can interrupt the input of power from the AC-DC convertor circuit 112C into the motor drive circuit MD.

Another feature of the embodiment is that power is inputted from the AC-DC convertor circuit 112C into the motor drive circuit MD when the fixing device detection switch 15 is in the first state.

As a result, because power is inputted into the motor drive circuit MD from the AC-DC convertor circuit 112C, the printer 1 can discharge sheets S conveyed through the process member 4 and fixing device 9 onto the rear cover 12 of the printer 1 when the rear cover 12 is in the open state.

Another feature of the embodiment is that the printer 1 is also provided with the high-voltage power supply board 114 that uses power inputted from the AC-DC convertor circuit 112C to supply process power to the process member 4. Because the AC-DC convertor circuit 112C and high-voltage generator circuit 114C are in a connected state when the fixing device detection switch 15 is in the first state, power can be inputted from the AC-DC convertor circuit 112C into the high-voltage generator circuit 114C. Because the AC-DC convertor circuit 112C and high-voltage generator circuit 114C are in a disconnected state when the fixing device detection switch 15 is in the second state, the input of power from the AC-DC convertor circuit 112C to the high-voltage generator circuit 114C can be interrupted.

As a result, power can be inputted from the AC-DC convertor circuit 112C into the high-voltage generator circuit 114C while this fixing device detection switch 15 is in the first state, regardless of whether the rear cover 12 is open or closed. Accordingly, the printer 1 can discharge sheets S conveyed through the process member 4 and fixing device 9 onto the rear cover 12 of the printer 1 even when the rear cover 12 is in the open state. However, when the user has removed the fixing device 9 with the rear cover 12 being in the open state, the fixing device detection switch 15 of the printer 1 can interrupt the input of power from the AC-DC convertor circuit 112C to the high-voltage generator circuit 114C.

Another feature of the embodiment is that the printer 1 is also provided with the ASIC 101, and the switching circuit 103 that switches whether power generated by the AC-DC convertor circuit 112C is inputted into the high-voltage generator circuit 114C. The fixing device detection switch 15 inputs power into the switching circuit 103 when in the first state and does not input power into the switching circuit 103 when in the second state. When the fixing device detection switch 15 inputs power into the switching circuit 103, the switching circuit 103 switches whether power from the AC-DC convertor circuit 112C is to be inputted into the high-voltage generator circuit 114C depending on the presence of an instruction from the ASIC 101.

As a result, the switching circuit 103 can switch whether power is inputted into the high-voltage generator circuit 114C depending on the presence of an instruction from the ASIC 101, when the fixing device 9 is mounted in the device body 2.

Another feature of the embodiment is that the printer 1 is also provided with the device-side connector 150; the AC-DC power supply board 112 that possesses the AC-DC convertor circuit 112C and that receives inputted AC power supplied from a commercial power supply; and the inlet 200 into which the commercial power supply inputs AC power. The fixing device 9 has the heater 93 that is connected to the inlet 200 via the relay 112D; and the component-side connector 160 that is connected to the device-side connector 150 when the fixing device 9 is mounted in the device body 2. The AC-DC power supply board 112 supplies AC power to the heater 93 via the device-side connector 150 and the component-side connector 160.

In this way, the AC-DC power supply board 112 can supply AC power to the heater 93 via the device-side connector 150 and component-side connector 160.

Another feature of the embodiment is that the printer 1 is also provided with the high-voltage power supply board 114, which has the high-voltage generator circuit 114C for generating process power to be supplied to the process member 4, and which is arranged beside one side of the device body 2 such that the surfaces of the board are parallel to the one side; and the main board 100, which has the ASIC 101 and which is arranged beside the other side of the device body 2 opposing (facing) the one side on which the high-voltage power supply board 114 is provided such that the surfaces of the board are parallel to the other side of the device body 2. The device-side connector 150 is disposed beside the one side of the device body 2, and the component-side connector 160 is located beside the one side of the device body 2 when the fixing device 9 is mounted in the device body 2. The main board 100 and high-voltage power supply board 114 are connected by the first connection lines CA1 that are arranged along the inner top surface or inner bottom surface of the device body 2. The high-voltage power supply board 114 and device-side connector 150 are connected by the second connection lines CA2. In this way, the main board 100 is connected to the fixing device 9 via the first connection lines CA1, high-voltage power supply board 114, second connection lines CA2, device-side connector 150, and component-side connector 160. In other words, the high-voltage power supply board 114 has the process-power supply member, the high-voltage power supply board 114 is located next to and parallel to one side surface of the device body 2. Here, the one side surface is an inner surface of the right side (right-side wall) of the device body 2. The main board 100 has the ASIC 101. The main board 100 is located next to and parallel to another side surface of the device body facing the one side surface of the device body 2. Here, the another side surface is an inner surface of the left side (left-side wall) of the device body 2. The device-side connector 150 is located next to the one side surface of the device body. The component-side connector 160 is located next to the one side surface of the device body 2 when the fixing device 9 is mounted in the device body 2. The first connection line is arranged along a top surface or a bottom surface of the device body 2. Put another way, the high-voltage power supply board 114 is located on the second resin body 49B and is between the second resin frame 49B and the right-side wall of the main body 2. The main board 100 is located on the sheet metal frame 48 and is between the sheet metal frame 48 and the left-side wall of the main body 2.

Thus, because the main board 100 is connected to the fixing device 9 via the first connection lines CA1, high-voltage power supply board 114, second connection lines CA2, device-side connector 150, and component-side connector 160, connection wires for connecting the main board 100 directly to the device-side connector 150 can be omitted. With this configuration, the device body 2 can be made more compact by eliminating the need to provide a path for connection wires connecting the main board 100 to the device-side connector 150.

Another feature of the embodiment is that the printer 1 is also provided with the discharge tray 22 onto which a sheet S is discharged after a developer image have been fixed on the sheet S by the fixing device 9; and the rear cover open/close detection switch 14 for detecting whether the rear cover 12 is open or closed. In a case that the fixing device detection switch 15 is in the first state (S20: YES) and the rear cover open/close detection switch 14 detects that the rear cover 12 is closed (S14: NO) when a print command is received, the ASIC 101 performs a normal discharge in which the sheet S passing through the process member 4 and fixing device 9 is discharged onto the discharge tray 22 (S40 of FIG. 8). In a case that the fixing device detection switch 15 is in the first state (S20: YES) and the rear cover open/close detection switch 14 detects that the rear cover 12 is open (S14: YES) when a print command is received, the ASIC 101 performs a straight discharge in which the sheet S passing through the process member 4 and fixing device 9 is discharged onto the rear cover 12. When the fixing device detection switch 15 is switched from the first state to the second state while the straight discharge is being executed (S20: NO), the ASIC 101 issues an instruction to the relay 112D to interrupt the connection between the inlet 200 and the heater 93 (S30).

In this way, when the fixing device detection switch 15 switches from the first state to the second state while the ASIC 101 is executing the straight discharge, the ASIC 101 can cancel the straight discharge.

Another feature of the embodiment is that the printer 1 is provided with the power line PL, which extends through the fixing device detection switch 15, for inputting power generated by the AC-DC convertor circuit 112C into each of the motor drive circuit MD, the detection circuit 104 and the switching circuit 103. After passing from the AC-DC convertor circuit 112C through the fixing device detection switch 15, the power line PL branches at the first branch point BP1 downstream of the fixing device detection switch 15 to connect to the motor drive circuit MD. The power line PL also branches at a second branch point BP2 further downstream to connect to the detection circuit 104. The end of the power line PL also connects to the switching circuit 103.

With this configuration, a single power line PL can be shared by the motor drive circuit MD, ASIC 101, detection circuit 104, and switching circuit 103.

Another feature of the embodiment is that the fixing device 9 possesses levers 140 that can rotate about the lever shaft 140A between the first position and second position and that possess grip parts 142 gripped by the user. Further, one of the levers 140 has a switch contact part 143 that can contact the fixing device detection switch 15. While the grip parts 142 are not being gripped, the levers 140 are in the first position and the switch contact part 143 contacts the fixing device detection switch 15, placing the fixing device detection switch 15 in the first state. When the grip parts 142 are gripped, the levers 140 are rotated from the first position to the second position and the switch contact part 143 separates from the fixing device detection switch 15, allowing the fixing device detection switch 15 to move to the second state. In other words, when the grip part 142 receives no external force, the lever 140 is in the first position and the switch contact part 143 contacts the fixing device detection switch 15 to place the fixing device detection switch 15 in the first state whereas when the grip part 142 receives an external force, the lever 140 is rotated from the first position to the second position and the switch contact part 143 separates from the fixing device detection switch 15 to allow the fixing device detection switch 15 to move to the second state.

In this way, the fixing device detection switch 15 can be used to accurately detect whether the fixing device 9 is mounted in the device body 2 or removed from the device body 2.

Another feature of the embodiment is that the rear cover 12 can support a sheet S conveyed through the process member 4 and fixing device 9 when in the open state.

With this configuration, sheets S exiting the fixing device 9 can be discharged straight onto the rear cover 12.

As described above, the printer 1 according to the embodiment is provided with the device body 2; the rear cover 12 that can open and close the rear opening 2B in the device body 2; the process member 4 that forms developer images on a sheet S; the fixing device 9 that fixes a developer image formed on the sheet S by the process member 4 and can be removed through the rear opening 2B while the rear cover 12 is open; the AC-DC convertor circuit 112C that outputs power; the high-voltage generator circuit 114C that uses the power inputted from the AC-DC convertor circuit 112C to supply process power to the process member 4; and the fixing device detection switch 15, which is in a first state when the fixing device 9 is mounted in the device body 2 and a second state when the fixing device 9 is removed from the device body 2. When in the first state, the fixing device detection switch 15 enables power from the AC-DC convertor circuit 112C to be inputted into the high-voltage generator circuit 114C by connecting the AC-DC convertor circuit 112C to the high-voltage generator circuit 114C. When in the second state, the fixing device detection switch 15 interrupts the input of power from the AC-DC convertor circuit 112C to the high-voltage generator circuit 114C by disconnecting the AC-DC convertor circuit 112C from the high-voltage generator circuit 114C.

Thus, the printer 1 of the present embodiment is provided with the fixing device detection switch 15 that turns on when the fixing device 9 is mounted in the device body 2 and that turns off when the fixing device 9 is removed from the device body 2, regardless of whether the rear cover 12 is open or closed. Because power from the AC-DC convertor circuit 112C can be inputted into the high-voltage generator circuit 114C when the fixing device detection switch 15 is in the first state, irrespective of whether the rear cover 12 is open or closed, the printer 1 can discharge sheets S conveyed through the process member 4 and fixing device 9 onto the rear cover 12 of the printer 1 when the rear cover 12 is open. Conversely, when the rear cover 12 is in the open state and the user removes the fixing device 9, the fixing device detection switch 15 of the printer 1 can interrupt the input of power from the AC-DC convertor circuit 112C to the high-voltage generator circuit 114C.

Another feature of the embodiment is that the printer 1 is provided with the ASIC 101 as a controller, and the switching circuit 103 that switches whether power generated by the AC-DC convertor circuit 112C is inputted into the high-voltage generator circuit 114C. The fixing device detection switch 15 inputs power into the switching circuit 103 when in the first state and does not input power into the switching circuit 103 when in the second state. When the fixing device detection switch 15 inputs power into the switching circuit 103, the switching circuit 103 switches whether power from the AC-DC convertor circuit 112C is to be inputted into the high-voltage generator circuit 114C according to the presence of an instruction from the ASIC 101.

As a result, the switching circuit 103 can switch whether power from the AC-DC convertor circuit 112C is to be inputted into the high-voltage generator circuit 114C depending on the presence of an instruction from the ASIC 101, when the fixing device 9 is mounted in the device body 2.

Another feature of the present embodiment is that the printer 1 is also provided with the device-side connector 150; the AC-DC power supply board 112 that has the AC-DC convertor circuit 112C and that receives inputted AC power supplied from a commercial power supply; and the inlet 200, as an input terminal, into which the AC power supplied from the commercial power supply is inputted. The fixing device 9 has the heater 93 connected to the inlet 200 via the relay 112D; and the component-side connector 160 that is connected to the device-side connector 150 when the fixing device 9 is mounted in the device body 2 and that supplies AC power, which is supplied via the relay 112D and the device-side connector 150, to the heater 93. The AC-DC power supply board 112 has the AC-DC convertor circuit 112C. The AC-DC power supply board 11 supplies AC power to the heater 93 via the device-side connector 150 and the component-side connector 160. The ASIC 101 instructs the relay 112D to disconnect the inlet 200 from the heater 93 when the fixing device detection switch 15 switches from the first state to the second state during an image forming operation while the rear cover 12 is open.

With this configuration, the AC-DC power supply board 112 can supply AC power to the heater 93 via the device-side connector 150 and component-side connector 160.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

(1) The printer 1 is described in the above embodiment as an example of the image forming device, but the image forming device may be a monochrome laser printer. The image forming device may also be a multifunction peripheral or a copy machine rather than a printer.

(2) In the above embodiment, the right side is given as an example of the one side of the device body 2 but this is merely because the right side is the side having sufficient space for arranging the device-side connector 150 and component-side connector 160. In other words, the left side may serve as the one side of the device body 2 when the left side is the side with sufficient space to arrange the device-side connector 150 and component-side connector 160.

(3) The above embodiment does not mention shutting off the power supply voltage supplied to the motor drive circuit (not shown) for driving the process motor 107, but this power supply voltage may be shut off at the same timing as the motor drive circuit MD.

What is claimed is:

1. An image forming device comprising:

a device body having an opening;

a cover configured to open and close the opening;

a process member configured to form a developer image on a sheet;

a fixing device removably mountable in the device body, the fixing device mounted in the device body being configured to fix the developer image formed on the sheet, the fixing device being removable from the device body through the opening when the cover is open;

a conveyance roller configured to convey the sheet toward the process member and the fixing device;

a motor configured to rotate the conveyance roller;

a power supply member configured to output power;

a motor drive member configured to rotate the motor using the power inputted from the power supply member; and a switch switchable between:

a first state in which the switch connects the motor drive member to the power supply member to allow input of the power to the motor drive member from the power supply member; and a second state in which the switch disconnects the motor drive member from the power supply member to interrupt input of the power to the motor drive member from the power supply member when the fixing device is removed from the device body, wherein the switch is configured to switch to the first state when the fixing device is mounted in the device body regardless of whether the cover is open or closed, and wherein the switch is configured to switch to the second state when the fixing device is removed from the device body.

2. The image forming device according to claim 1, wherein in the first state the switch is configured to transfer the power from the power supply member to the motor drive member.

3. The image forming device according to claim 2, further comprising:

a process-power supply member configured to supply process-power to the process member based on the power inputted from the power supply member, wherein in the first state the switch allows connection between the process-power supply member and the power supply member to allow input of the process-power to the process-power supply member from the power supply member, and wherein in the second state the switch further disconnects the process-power supply member from the power supply member to interrupt input of the process-power to the process-power supply member from the power supply member.

4. The image forming device according to claim 3, further comprising:

a controller; and a switching member, wherein in the first state the switch is configured to transfer the power to the switching member, wherein in the second state the switch is configured to interrupt input of the power into the switching member, and wherein when the switch transfers the power to the switching member, the switching member switches between a transferring state in which the switching member transfers the power to the process-power supply member and an interrupting state in which the switching member interrupts input of the power to the process-power supply member, according to a signal from the controller.

5. The image forming device according to claim 4, further comprising:

a main-body-side connector;

an input terminal configured to receive alternating current (AC) power from a commercial power supply; and a first power supply board having the power supply member and a relay, the first power supply board being configured to receive the AC power from the input terminal, wherein the fixing device includes:

a heater connectable to the input terminal via the relay; and a fixing-side connector configured to be connected to the main-body-side connector when the fixing device is mounted in the device body, and wherein the first power supply board is configured to transfer the AC power to the heater via the main-body-side connector and the fixing-side connector.

6. The image forming device according to claim 5, further comprising:

a second power supply board having the process-power supply member, the second power supply board being located next to and parallel to one side surface of the device body;

a main board having the controller, the main board being located next to and parallel to another side surface of the device body facing the one side surface of the device body;

a first connection line connecting the main board to the second power supply board; and a second connection line connecting the second power supply board to the main-body-side connector, wherein the main-body-side connector is located next to the one side surface of the device body, wherein the fixing-side connector is located next to the one side surface of the device body when the fixing device is mounted in the device body, wherein the first connection line is arranged along a top surface or a bottom surface of the device body, and wherein the main board is connected to the fixing device via the first connection line, the second power supply board, the second connection line, the main-body-side connector, and the fixing-side connector.

7. The image forming device according to claim 5, further comprising:

a discharge tray onto which the sheet with the fixed developer image can be discharged; and a cover sensor configured to detect whether the cover is open or closed, wherein the controller is configured to perform:

in a case that a print command is received while the switch is in the first state and the cover sensor detects that the cover is closed, a normal discharge control in which the sheet that has passed through both the process member and the fixing device is discharged onto the discharge tray;

in a case that the print command is received while the switch is in the first state and the cover sensor detects that the cover is open, a straight discharge operation in which the sheet that has passed through both the process member and the fixing device is discharged onto the cover; and in a case that the switch is switched from the first state to the second state during the straight discharge operation, controlling the relay to disconnect the heater from the input terminal.

8. The image forming device according to claim 4, further comprising:

a detection member configured to output a detection signal to the controller, the detection signal varying depending on whether the switch is in the first state or the second state; and a power line connecting the power supply member to the switching member via the switch, wherein the motor drive member and the detection member are connected in parallel with the switching member via the power line, the power line allowing input of the power from the power supply member into each of the motor drive member, the detection member, and the switching member through the switch.

9. The image forming device according to claim 1, further comprising:

a lever configured to rotate about a lever shaft between a first position and a second position, the lever including: a grip part; and a switch contact part configured to contact the switch, wherein when the grip part receives no external force, the lever is in the first position and the switch contact part contacts the switch to place the switch in the first state whereas when the grip part receives an external force, the lever is rotated from the first position to the second position and the switch contact part separates from the switch to allow the switch to move to the second state.

10. The image forming device according to claim 1, wherein when the cover is open, the cover can support the sheet passing through both the process member and the fixing device.

11. The image forming device according to claim 1, wherein when the cover is open, the sheet that has passed through both the process member and the fixing device is discharged onto the cover.

12. An image forming device comprising:

a device body having an opening;

a cover configured to open and close the opening;

a process member configured to form a developer image on a sheet;

a fixing device removably mountable in the device body, the fixing device mounted in the device body being configured to fix the developer image formed on the sheet, the fixing device being removable from the device body through the opening when the cover is open;

a power supply member configured to output power;

a process-power supply member configured to supply process-power to the process member based on the power inputted from the power supply member;

a controller;

a switching member; and a switch switchable between:

a first state in which the switch allows connection between the process-power supply member and the power supply member to allow input of the process-power to the process-power supply member from the power supply member and the switch is configured to transfer the power to the switching member; and a second state in which the switch disconnects the process-power supply member from the power supply member to interrupt input of the process-power to the process-power supply member from the power supply member and the switch is configured to interrupt input of the power into the switching member, wherein when the switch transfers the power to the switching member, the switching member switches between a transferring state in which the switching member transfers the power to the process-power supply member and an interrupting state in which the switching member interrupts input of the power to the process-power supply member, according to a signal from the controller, wherein the switch is configured to switch to the first state when the fixing device is mounted in the device body, and wherein the switch is configured to switch to the second state when the fixing device is removed from the device body.

13. The image forming device according to claim 12, further comprising:

a main-body-side connector;

an input terminal configured to receive alternating current (AC) power from a commercial power supply; and a first power supply board having the power supply member and a relay, the first power supply board being configured to receive the AC power from the input terminal, wherein the fixing device includes:

a heater connectable to the input terminal via the relay; and a fixing-side connector configured to be connected to the main-body-side connector when the fixing device is mounted in the device body, wherein the first power supply board is configured to transfer the AC power to the heater via the main-body-side connector and the fixing-side connector, and wherein the controller is configured to perform:

controlling the relay to disconnect the heater from the input terminal when the switch switches from the first state to the second state during an image forming operation with the cover open.

14. The image forming device according to claim 13, further comprising:

a second power supply board having the process-power supply member, the second power supply board being located next to and parallel to one side surface of the device body;

a main board having the controller, the main board being located next to and parallel to another side surface of the device body facing the one side surface of the device body;

a first connection line connecting the main board to the second power supply board; and a second connection line connecting the second power supply board to the main-body-side connector, wherein the main-body-side connector is located next to the one side surface of the device body, wherein the fixing-side connector is located next to the one side surface of the device body when the fixing device is mounted in the device body, wherein the first connection line is arranged along a top surface or a bottom surface of the device body, and wherein the main board is connected to the fixing device via the first connection line, the second power supply board, the second connection line, the main-body-side connector, and the fixing-side connector.

15. The image forming device according to claim 13, further comprising:

a discharge tray onto which the sheet with the fixed developer image can be discharged; and a cover sensor configured to detect whether the cover is open or closed, wherein the controller is configured to perform:

in a case that a print command is received while the switch is in the first state and the cover sensor detects that the cover is closed, a normal discharge control in which the sheet passing through both the process member and the fixing device is discharged onto the discharge tray;

in a case that the print command is received while the switch is in the first state and the cover sensor detects that the cover is open, a straight discharge operation in which the sheet passing through both the process member and the fixing device is discharged onto the cover; and in a case that the switch is switched from the first state to the second state during the straight discharge operation, controlling the relay to disconnect the heater from the input terminal.

16. The image forming device according to claim 12, further comprising:

a lever configured to rotate about a lever shaft between a first position and a second position, the lever including: a grip part; and a switch contact part configured to contact the switch, wherein when the grip part receives no external force, the lever is in the first position and the switch contact part contacts the switch to place the switch in the first state whereas when the grip part receives an external force, the lever is rotated from the first position to the second position and the switch contact part separates from the switch to allow the switch to move to the second state.

17. The image forming device according to claim 12, wherein when the cover is open, the cover can support the sheet passing through both the process member and the fixing device.

18. An image forming device comprising:

a device body having an opening;

a cover configured to open and close the opening;

a process member configured to form a developer image on a sheet;

a fixing device removably mountable in the device body, the fixing device mounted in the device body being configured to fix the developer image formed on the sheet, the fixing device being removable from the device body through the opening when the cover is open;

a conveyance roller configured to convey the sheet toward the process member and the fixing device;

a motor configured to rotate the conveyance roller;

a power supply member configured to output power;

a motor drive member configured to rotate the motor using the power inputted from the power supply member;

a switch switchable between:

a first state in which the switch connects the motor drive member to the power supply member to allow input of the power to the motor drive member from the power supply member; and a second state in which the switch disconnects the motor drive member from the power supply member to interrupt input of the power to the motor drive member from the power supply member when the fixing device is removed from the device body; and a lever configured to rotate about a lever shaft between a first position and a second position, the lever including: a grip part; and a switch contact part configured to contact the switch, wherein when the grip part receives no external force, the lever is in the first position and the switch contact part contacts the switch to place the switch in the first state whereas when the grip part receives an external force, the lever is rotated from the first position to the second position and the switch contact part separates from the switch to allow the switch to move to the second state, wherein the switch is configured to switch to the first state when the fixing device is mounted in the device body, and wherein the switch is configured to switch to the second state when the fixing device is removed from the device body.

* * * * *